Oct. 6, 1959 F. A. TEGELER 2,907,828

BURGLAR ALARM SYSTEM

Filed May 1, 1958 6 Sheets-Sheet 1

INVENTOR.
Frederick A. Tegeler.
BY Fishburn and Gold
ATTORNEYS.

Oct. 6, 1959 F. A. TEGELER 2,907,828

BURGLAR ALARM SYSTEM

Filed May 1, 1958 6 Sheets-Sheet 2

INVENTOR.
Frederick A. Tegeler.

BY Fishburn & Gold

ATTORNEYS.

Oct. 6, 1959 F. A. TEGELER 2,907,828

BURGLAR ALARM SYSTEM

Filed May 1, 1958 6 Sheets-Sheet 3

INVENTOR.
Frederick A. Tegeler.
BY Fishburn & Gold
ATTORNEYS.

Oct. 6, 1959 F. A. TEGELER 2,907,828

BURGLAR ALARM SYSTEM

Filed May 1, 1958 6 Sheets-Sheet 4

INVENTOR.
Frederick A. Tegeler.
BY
Fraleburn & Gold
ATTORNEYS.

Oct. 6, 1959 F. A. TEGELER 2,907,828

BURGLAR ALARM SYSTEM

Filed May 1, 1958 6 Sheets-Sheet 5

INVENTOR.
Frederick A. Tegeler.
BY Fishburn & Gold
ATTORNEYS.

INVENTOR.
Frederick A. Tegeler.
BY
Fishburn and Gold
ATTORNEYS.

United States Patent Office 2,907,828

Patented Oct. 6, 1959

2,907,828

BURGLAR ALARM SYSTEM

Frederick A. Tegeler, St. Joseph, Mo.

Application May 1, 1958, Serial No. 732,319

13 Claims. (Cl. 179—5)

This invention relates to alarm devices of the type used as burglar alarms or the like in residences or business establishments for automatically sending a recorded message to a police station or other pre-selected phone number, more particularly this invention relates to an apparatus which, upon opening one circuit and closing another circuit, elevates the receiver of a telephone, dials the pre-selected number, and sends the recorded message.

At present there are numerous and varied alarm systems in commercial use, but they generally involve the use of relatively complex and expensive apparatus which is unsuitable for use by small businessmen or in residences where efficient but inexpensive protection is needed. Some of the alarm apparatus in present use includes a telephone as a part thereof, but either requires considerable changes in the telephone which is not permitted by the telephone companies, or wherein said telephone cannot be used again in the normal manner, or the systems are merely to release the dial and effect connection with the operator.

The principal objects of the present invention are to provide a novel plate member on a turn-table in connection with a telephone dial for dialing a pre-selected series of numbers; to provide a lifting device actuated by the turntable for lifting the telephone receiver prior to the dialing operations; to provide a plurality of spring tensioned pins for engaging a plate member having pre-selected apertures therein corresponding to the number which is desired to be dialed; to provide a slide bar between said pins and plate member slidable relative to said pins and having an aperture therein for permitting the pins to extend therethrough in succession; to provide a driving cam for moving the slide bar inwardly relative to the pins upon successive rotation of the turn-table; to provide a pulley on the plate member having a cable thereon in communication with the dialing disc of a telephone for rotating the dialing disc in response to rotation of the plate member; to provide a record playing machine in close relation to the receiver of the telephone; to provide an electrical circuit whereby the dialing operation and the playing of the record commence substantially simultaneously; to provide an electrical circuit whereby pushing an alarm button or breakage of a window or the like opens an internal circuit and closes an external circuit to the alarm device and recording machine thereby activating the same; to provide a spring actuated swing bar adapted to engage the lifting device for lowering the receiver after the record has been played; and to provide a burglar alarm system which is economical to manufacture, readily installed and set to dial any desired series of numbers, and easily controlled and maintained.

In accomplishing these and other objects of the present invention, I have provided improved details of structure, the preferred forms of which are illustrated in the accompanying drawings, wherein.

Figure 1:
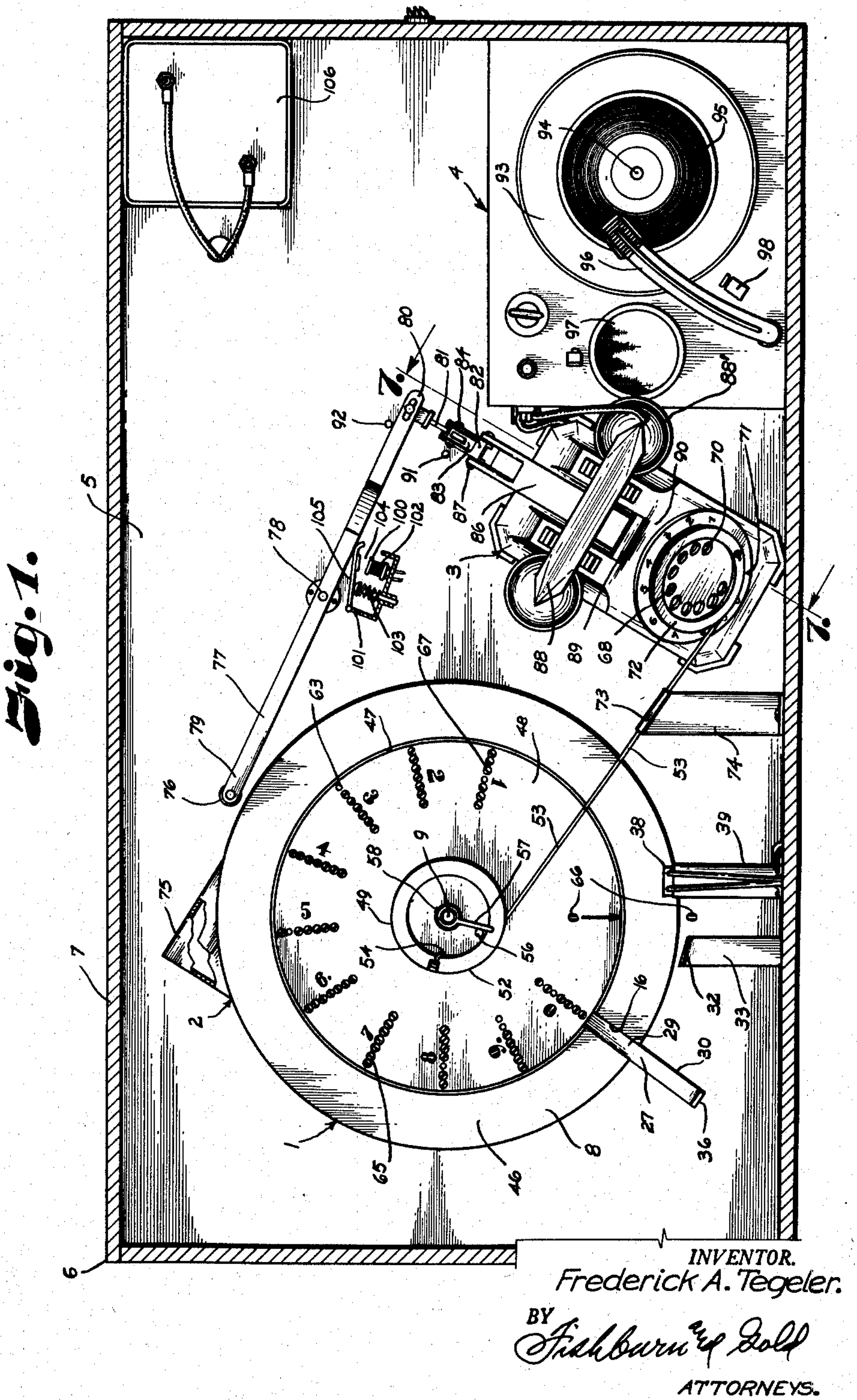
Fig. 1 is a plan view of my burglar alarm system showing the dialing mechanism, telephone and phonograph in their preferred positioning with the apparatus inoperative.

The reference numeral 1 generally indicates a burglar alarm apparatus embodying the features of the present invention and having a dialing mechanism 2, a telephone 3 and a phonograph or the like 4. The burglar alarm system may be mounted on a partition 5 of a box or cabinet 6 having side walls 7. The dialing apparatus 2 has a turn-table 8 rotatably mounted on a shaft 9 secured at its bottom end to the partition 5. The turn-table 8 has a downwardly extending annular flange 10 spaced from the outer edge and which has a friction wheel 11 engaging the inner surface 12 of the flange 10 for rotating the turn-table. An electric motor 13 supported on the partition 5 has a motor shaft 14 frictionally engaging a friction pulley 15 that is fixed to the friction wheel 11 to rotate therewith. With this drive, operation of the motor rotates the friction wheel 11 at a reduced speed because the motor shaft is substantially smaller than the friction pulley 15.

The turn-table 8 has a radially extending groove 16, and a housing 17 which includes a plurality of spaced vertical partitions 18 forming compartments 19 spaced in radial alignment along the bottom of the groove 16. The housing 17 is spaced radially from the shaft 9, and is spaced from the lower end of the annular flange 10 a distance sufficient to clear friction wheel 11. The top and bottom of the housing 17 within the compartments 19 are provided with aligned openings 20, the top wall being substantially flush with the bottom of the groove 16. Elongated pins 21 are slidably engaged in said openings. Each pin 21 has a head 22 on its lower end, and a follower 23 secured thereon within the compartment 19 with a spring 24 between the follower 23 and the respective bottom wall 25 of the compartments 19 for sliding the pin 21 upwardly for a purpose later described. The pins 21 are of a length such that they extend above the top of the groove 16 when the followers 23 are raised against the upper wall 26 by the action of the spring 24 of the compartments 19, and such that the heads 22 are spaced below the housing 17 even when the pins are moved to their uppermost position.

Figures 3, 4:
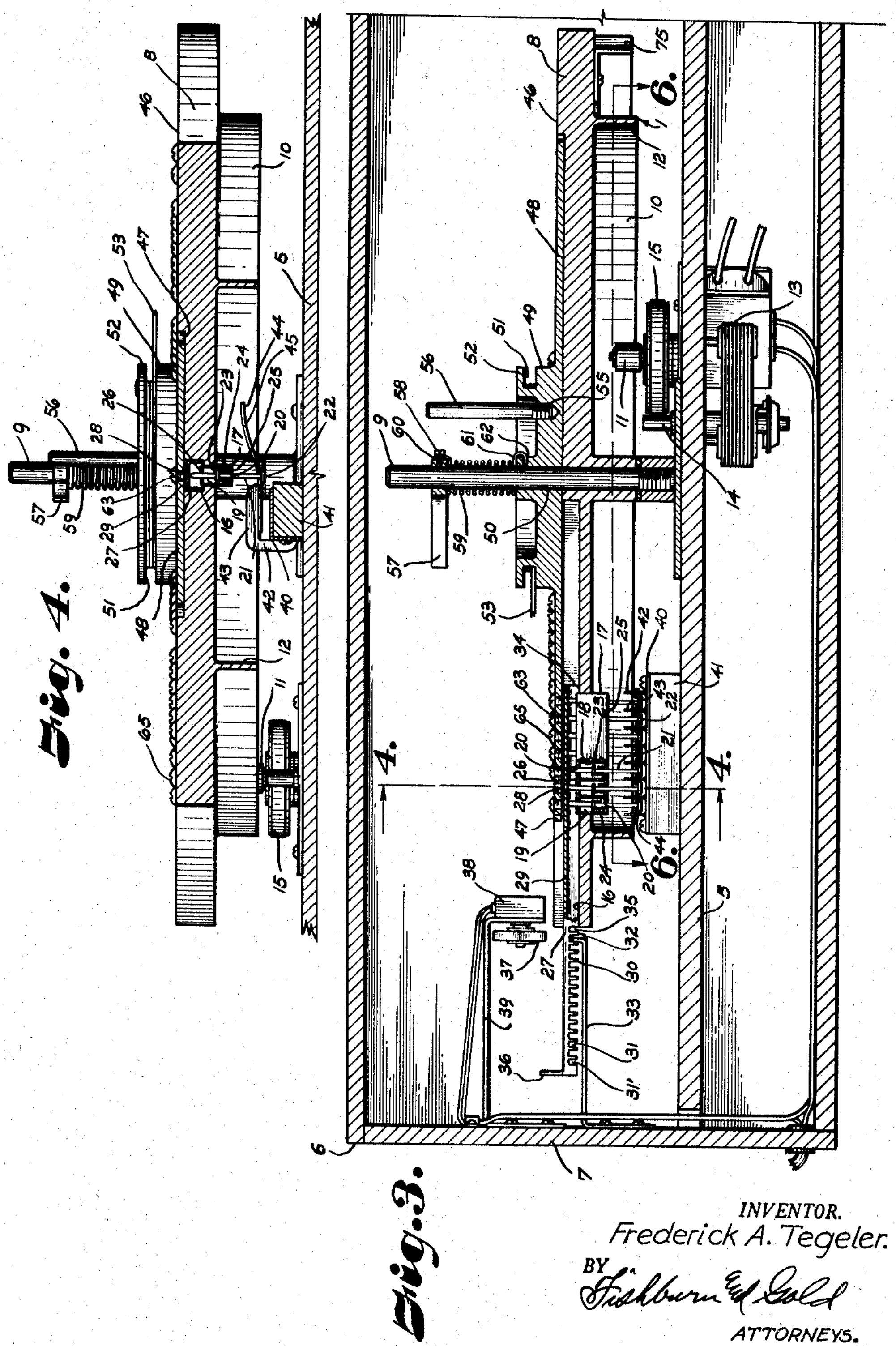
Fig. 3 is an enlarged vertical cross sectional view taken on a line 3—3, Fig. 2.
Fig. 4 is an enlarged vertical cross sectional view taken on a line 4—4, Fig. 3.
Figures 5, 6:
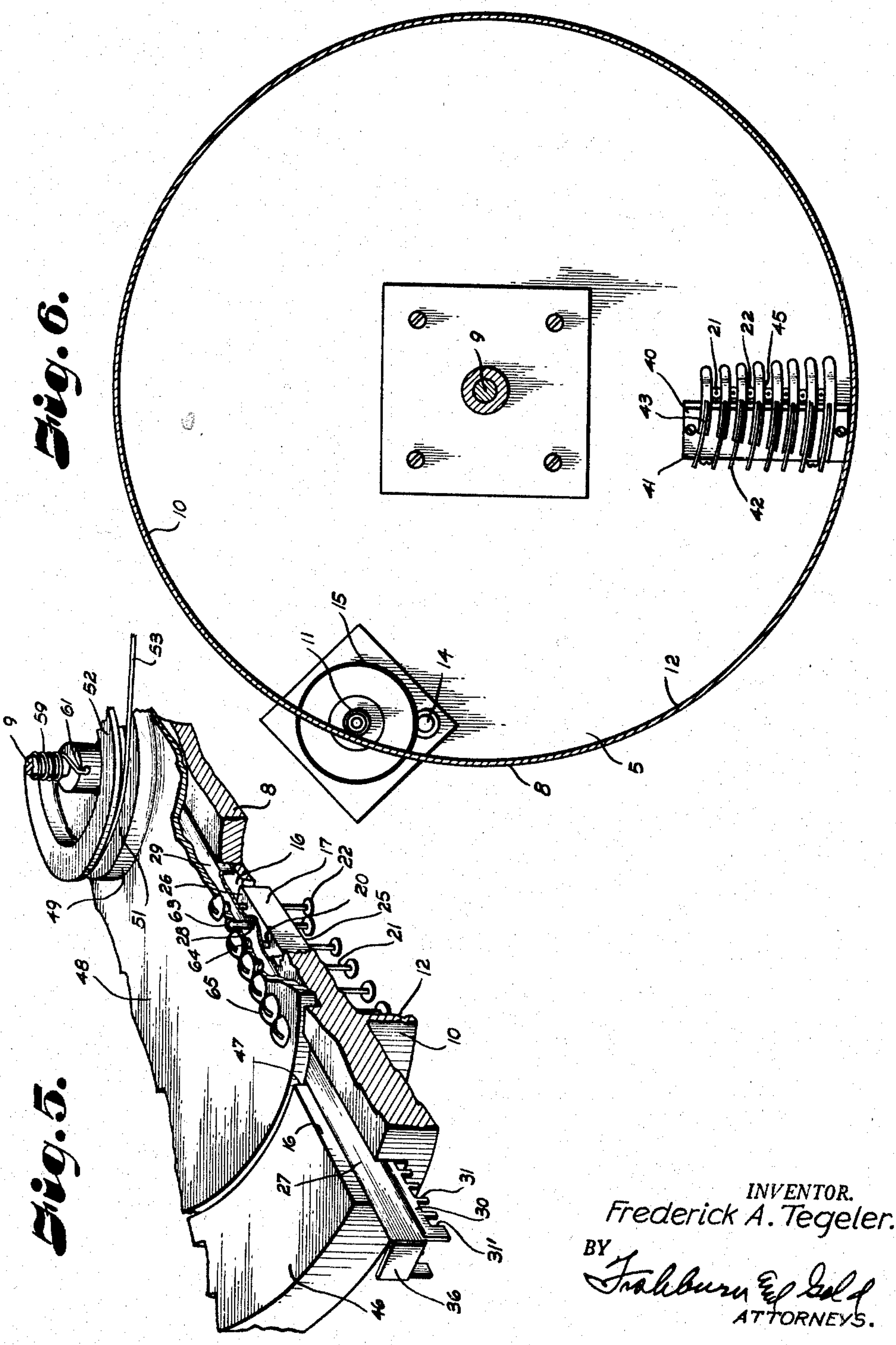
Fig. 5 is an enlarged fragmentary view of a portion of the turn-table and plate member with portions broken away to particularly illustrate the pins, slide bar and aperture in the plate member.
Fig. 6 is a horizontal cross sectional view taken on a line 6—6, Fig. 3 illustrating the driving mechanism for the turn-table and the trigger mechanism.

As shown in the accompanying drawings, Fig. 3, I have provided seven compartments and pins in this form of my invention, as that is normally the number of digits necessary to be dialed, particularly in a large city wherein the telephone system has various exchanges. However, it is necessary to have at least the number of pins as there are digits to be dialled.

A substantially U-shaped slide bar 27 is slidably engaged in the groove 16, and has a single opening 28 through the top wall 29 thereof for permitting the pins 21 to pass therethrough in succession as the bar is slid in the groove 16. The side walls 30 on the outer end portion of the bar 27 have aligned notches or grooves 31 adapted to be engaged by the tooth 32 of a driving cam 33 secured on the side wall 7. The tooth 32 is arcuate so that the bar 27 is moved inwardly one notch as a pair of aligned notches 31 are moved through the tooth. The opening 28 is spaced from the inner end 34 of the slide bar a distance which allows the opening 28 to be moved past the inner pin compartment 19 when the slide bar 27 is moved to its most inward position, and such that the top wall 29 of the slide bar 27, between the opening 28 and the end 34, engages the pins 21 and depresses them when the tooth 32 is engaged in the innermost notch 35 which is when the bar 27 is in its outermost or starting position. This permits the opening 28 to be moved into alignment with the pins 21 in succession, starting with the outermost pin and moving across said pins in succession upon rotation of the turn-table 8. It is preferable that the notches 31 be such that the inward movement of the slide bar is one-half the distance between two adjacent pins, which would necessitate having at least twice as many grooves 31 as pins 21, to move the opening 28 from alignment with one pin 21 to a position half-way to the adjacent pin upon one revolution of the turn-table 8 for a purpose hereinafter described. It is preferable that one additional notch be provided on the inner end of the notches to permit one revolution of the turn-table 8 before the opening 28 becomes aligned with the outermost pin 21, and an additional notch 31' on the outer end of the notches which permits the turn-table 8 to make an additional revolution after the innermost pin has been disengaged from the opening 28. At the end of the last said additional revolution, an extension 36 extending upwardly from the outer end of the slide bar 27 engages the lever arm 37 of a toggle type switch 38 mounted on a bracket 39 attached to the side wall 7 and overhanging the outer edge of the turntable 8 thereby breaking the current to the motor 13 and thus stopping the dialing mechanism 2.

A trigger mechanism 40 is mounted on the partition 5 under the turn-table 8 and is spaced radially from the shaft 9 a distance equal to that of the housing 17, as shown in Fig. 3. The trigger mechanism 40 has a block 41 mounted on the partition 5, with L-shaped bracket members 42 welded or otherwise suitably secured thereon and being substantially flat and extending upwardly in vertical planes spaced transversely apart a distance sufficient to permit a pin head 22 to pass therebetween as shown in Fig. 4. The L-shaped bracket members 42 are aligned such that the space between adjacent members is in alignment with the respective pins 21 thereabove, and have a portion 43 in overlying relation to the block 41, with flat horizontal fingers 44 curving upwardly from the bottom of the portion 43 to form cam trackways 45 for engaging over the pin heads 22 when the pin is in its uppermost position and camming it downwardly to disengage the pins from the slide bar 27 as shown in Fig. 4. It can be readily seen that as the turn-table makes a revolution, the pins 21 are engaged by the fingers 44 and cammed downwardly by the trackways 45 to their lowermost position, the tooth 32 on the drive cam 33 engages aligned notch 31 and pushes the slide bar in one notch while the pins 21 are moving through the trigger mechanism 40 in depressed position.

The upper surface 46 on the turn-table 8 has a circumferential recessed area 47 for slidably receiving a circular plate member 48 therein. The plate member 48 has a hub portion 49 provided with an opening 50 rotatably mounted on the shaft 9. The upper portion of the hub has an annular recess 51 in its peripheral edge forming a drum 52 for accommodating a cable 53 which has one end suitably secured thereto as at 54. The hub 49 is provided with a threaded bore 55 spaced from the shaft 9 for receiving a vertically extending post 56 for engaging a stop bar 57 secured on the upper end of the shaft 9 by means of a set screw 58. A coil spring 59 is sleeved over the shaft 9 between the stop bar 57 and the hub 49, and has ends 60 and 61 respectively engaging the stop bar 57 and a portion 62 of the hub 49 for urging the plate member 48 to rotate on the stationary shaft 9 in the direction opposite to the direction of rotation of the turntable 8 until the stop post 56 engages the stop bar 57 thereby preventing further rotation.

Figure 2:
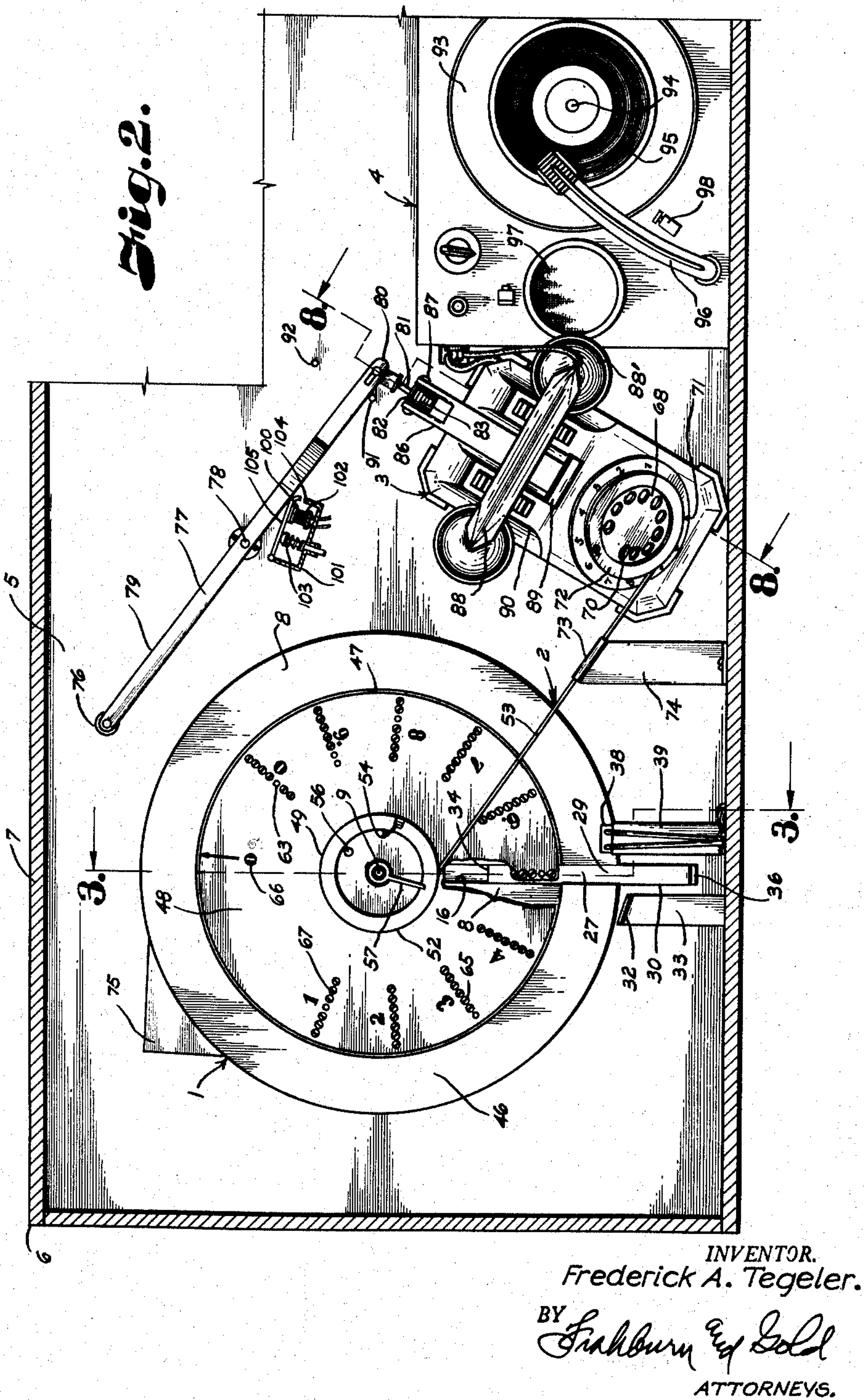
Fig. 2 is a plan view of the burglar alarm apparatus in operating position with the receiver lifted, and with a portion of the turn-table broken away for better illustrating the radially extending groove for the slide bar therein.

The plate member 48 has a plurality of rows of radially aligned apertures 63 spaced circumferentially apart and spaced the same radial distance from the shaft 9 as the pins 21 for receiving the pins therein. As shown in Figs. 1 and 2 there are ten such rows representing digits one to zero as found on a telephone dial. The radial rows of apertures are space apart in correspondence to the digits on a telephone dial, that is, the number of degrees from one to zero on plate member 48 equals the number of degrees from one to zero on a telephone dial for a purpose later deescribed. The apertures 63 have threaded bores 64 for receiving screws 65 therein, with the apertures representing the digits to be dialed being left open. The apertures in a radial row represent a single digit, as for example the digit one, and the relationship of the apertures in a radial row to each other is one of sequence. Therefore, an aperture not having a screw therein will be a digit to be dialed, and the positioning thereof determines the sequence in which it will be dialed. For example, the digit one, as shown in Fig. 1, is represented by the aperture left open therein, and therefore, the numeral one (1) will be dialed. The open aperture in the row designated one is the fourth aperture from the outer edge of the plate member 48 in radial spacing, and hence, the digit one will be the fourth digit to be dialed. It can readily be seen that any desired sequence of digits may be dialed by merely removing the proper screws 65 from the apertures 63, and closing up the other apertures in plate member 48 by insertion of screws therein.

What I prefer to designate as the setting point 66 of the plate member 48 is that point on the plate member which in radians measured from the row of apertures 67 representing the digit one to the setting point 66 corresponds to the point on the dialing disc 68 of telephone 3 measured from the aperture representing the digit one, as indicated at 70 (Fig. 1), to a point 71 which would normally be a finger stop on an ordinary telephone when the dialing disc is at rest. It can be seen that the same relationship exists between any row of apertures and the setting point 66 as between the corresponding digit and the point 71 on dialing disc 68. The setting point 66 of the plate member 48 is in radial alignment with the trigger mechanism 40, and is returned to that point by the spring 59 rotating the operating plate 48 until the stop post 56 engages the stop bar 57 which is positioned to hold the setting point in the described position as against the action of coil spring 50. The trigger mechanism 40, in this form of my invention, must be substantially the point which, with the shaft 9, defines the radius on which the setting point 66 is aligned, in that the pin 21 rotating the plate member 48 is disengaged from the said plate at this point. Therefore, the aperture 63, representing the digit being dialed, is moved through the same number of degrees as the corresponding digit on the dialing disc 68 of the telephone 3 is moved to dial said digit.

The drum 52 on operating plate 48 is substantially of the same circumference as a dial pulley 72 secured on the outer periphery of the dialing disc 68, by suitable means, to which is attached the other end of the cable 55. The cable 55 is substantially taut between drum 52 and dial pulley 72, and extends through a guide sleeve 73 formed in one end of a brace 74 having its other end rigidly secured to the side wall 6 for supporting the cable intermediate the drum 52 and dial pulley 72. As drum 52 is rotated through a certain number of degrees with plate member 48, the dial pulley 72 is rotated through an equal number of degrees, thereby dialing the digit represented by the aperture 63.

Figures 7, 8:
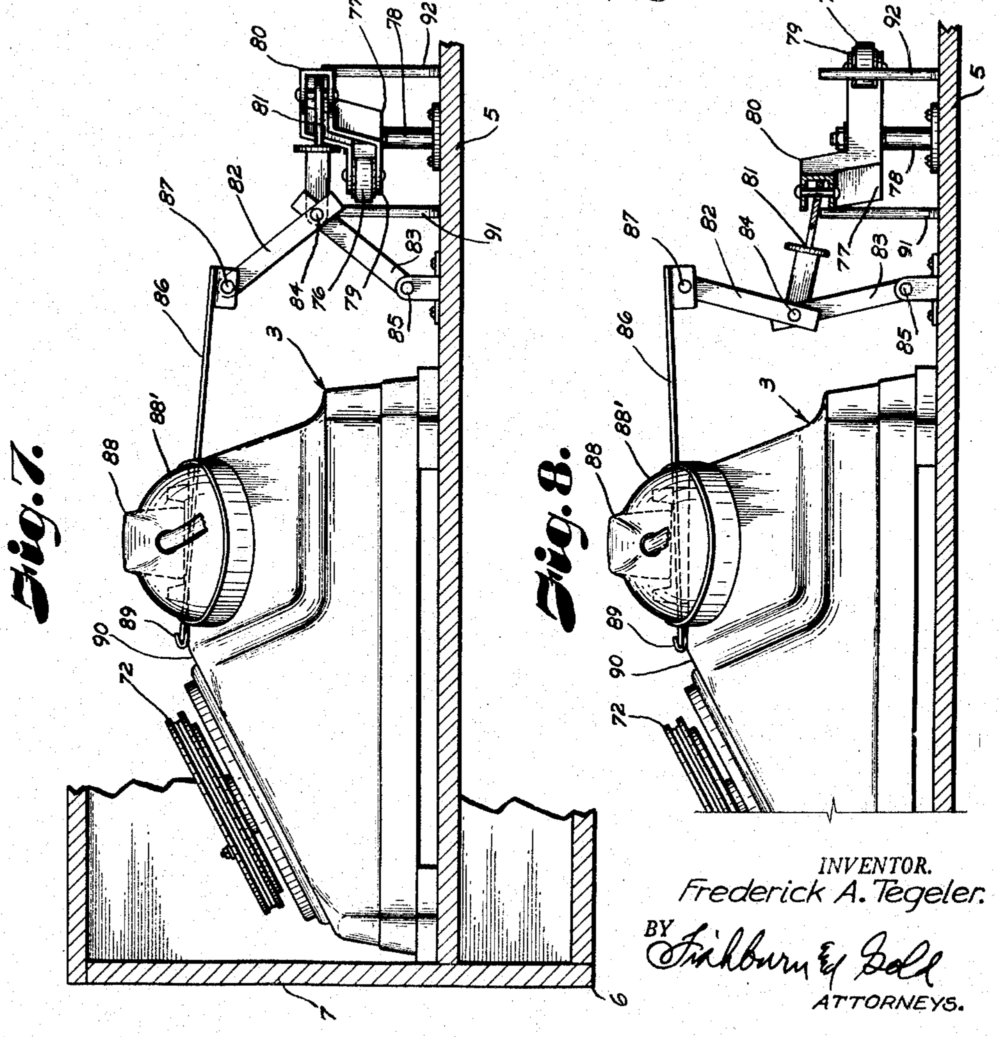
Fig. 7 is an enlarged sectional view taken on a line 7—7, Fig. 1 illustrating the lifting mechanism for the telephone receiver with the receiver in a down position.
Fig. 8 is a sectional view taken on a line 8—8, Fig. 2 illustrating the receiver lifting mechanism and showing the receiver in raised position.
Figures 10, 11, 12, 13:
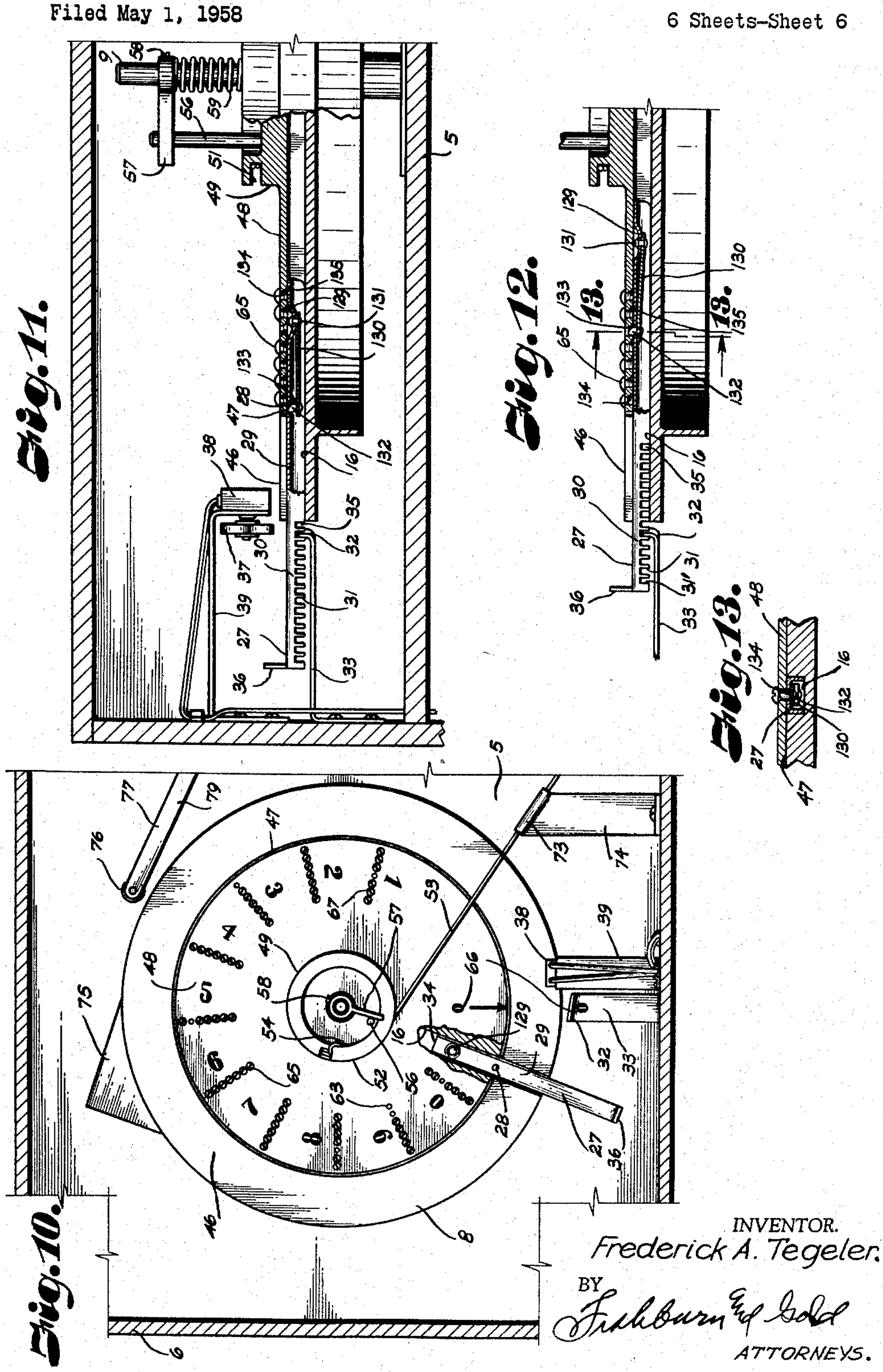
Fig. 10 is a plan view of the dialing apparatus of a modified form of my invention, with a portion of the plate member broken away.
Fig. 11 is an enlarged vertical cross sectional view through the turn-table and plate member illustrating the mounting of a single pin holder on the slide bar, with the pin moving under the plate member.
Fig. 12 is an enlarged vertical cross sectional view through the turn-table and plate member of the modified form, illustrating the pin engaging the plate member.
Fig. 13 is an enlarged vertical cross sectional view taken on a line 13—13, Fig. 12.

On the first revolution of the turn-table 8, an angular striker bar 75 depending from the edge of the turn-table engages a roller 76 rotatably mounted in the end of an arm 77 which is pivotally mounted on the partition 5 adjacent the dialing mechanism 2 and the telephone 3 thereof as indicated at 78 and moves the end 79 of the arm 77 carrying the roller 76 outwardly which in turn moves the opposite end 80 of the arm inwardly. The end 80 of the arm 77 is pivotally connected to one end of a connecting rod 81 with the other end of the connecting rod 81 connected to links 82 and 83. The links 82 and 83 are pivotally mounted at their adjacent ends to each other and the connecting rod 81 as indicated at 84 with the link 83 having its remote end pivotally connected to the partition 5 as indicated at 85 and the remote end of link 82 to one end of a lifting bar 86 as indicated at 87. The lifting bar 86 is adapted to engage under the receiver 88 of the telephone 3, and has the other end engaged in a hook member 89 secured to the housing 90 of the telephone whereby the receiver 88 is lifted off of the contacts (not shown) by raising the one end of the lifting bar 86. As the end 80 of the arm 77 is moved inwardly, the connecting rod 81 is moved thereby pushing the links 82 and 83 into an upright position which raises the lifting bar 86, and hence the receiver 88 whereby the telephone is then ready to be dialed. The movement of the end 80 of the arm 77 is restricted by stops 91 and 92 for engaging the end 80 respectively when the links 82 and 83 (Fig. 8) are substantially in alignment and when the links 82 and 83 are collapsed (Fig. 7).

The phonograph 4 is of a conventional structure and has a turn-table 93, a spindle 94, a record 95 carrying the designated message of alarm, and an arm and needle 96 for playing the record 95. The loud speaker outlet 97 is preferably in close relation to the mouthpiece 88′ of the receiver 88 so that the recorded message may be readily received and communicated by the telephone. The phonograph 4 is connected in an electrical circuit, hereinafter described, which starts the phonograph the same time the dialing machine is started, and permits the phonograph 4 to continue playing after the extension member 36 has shut off the dialing apparatus through switch 38. After the record 95 has been played arm 96 contacts a switch 98 which breaks the current to a phonograph motor 99.

The switch 98 also operates to deactivate a relay mechanism 100, which is connected thereto by an electric circuit hereinafter described. The relay mechanism 100 is positioned adjacent the arm 77 between the pivotal mounting 78 thereof and the end 80 for lowering the receiver 88 when not in use. The relay mechanism 100 has a housing 101, with an electromagnet 102 and a spring actuated piston 103 therein, and has an open end 104 adjacent the arm 77. A swing bar 105 composed of a metallic material attracted by the electromagnet 102, is pivotally mounted in the open end 104 and is adapted to swing in a horizontal plane. The spring actuated piston 103 engages the swing bar 105 and urges the same outwardly in opposition to the attraction of the electromagnet 102. The electromagnet 102 is connected in parallel to the circuits leading to motor 99 driving the phonograph turn-table 93, so that the electromagnet 102 is energized when the phonograph 4 is started, and de-energized when the phonograph motor 99 is stopped after arm 96 has operated switch 98. After the electromagnet 102 has been de-energized the spring actuated piston 103 acting on the swing bar 35, moves the arm 77 which in turn moves the end 80 of arm 77 outwardly to lower the receiver 88. The device for lowering the receiver 88 as described, is by way of illustration only, and obviously any other device which will accomplish this purpose may be used without effecting the operation of the dialing mechanism 2.

In using the dialing mechanism 2 heretofore described, the slide bar 27 is moved outwardly of groove 16 and set with the tooth 32 of the driving cam 33 in the innermost notch. The screws 65 in the apertures designating the desired numbers are removed in the radial sequence in which the digits of the number to be called occur. As shown in Fig. 1, the number would be 3, 5, 8, 1, 0, 9, 9, with the first three digits normally representing the exchange, and note that the outermost screw 65 on the row of threes is removed, the second screw from the outer edge on the row of fives, the third screw from the outer edge on the row of eights, the fourth screw from the outer edge on the row of ones, the fifth screw from the outer edge on the row of zeros, and the two innermost screws on the row of nines.

When the dialing mechanism 2 is started by activation of the electric motor 13, the turn-table 8 is rotated by the friction wheel 11, the angular striker bar 75 engages the end 79 of the arm 77 and thereby raises the receiver 88 placing the telephone in condition for use. The swing bar 105 is moved toward the electromagnet 102 and compresses the spring actuated piston 103 by the movement of the arm 77. The electromagnet 102 has been energized when the phonograph started, and thereby holds the swing bar 105 in opposition to the outward force exerted by the spring actuated piston 103. As the turn-table 8 rotates, the driving cam 33 slides the slide bar 27 inwardly placing the opening 28 in alignment with the outermost pin 21, which pin then travels within opening 28 until the open aperture 63 on the outer end of the row of threes comes in alignment with the opening 28 in bar 27. The pin 21 then extends through said open aperture 63 and engages the plate member 48 causing it to rotate with the turn-table 8, which in turn rotates drum 52 and the cable 53 rotates the dial plate 68. The pin in the open aperture 63 (Fig. 1), represented by the digit three, comes around into engagement with the trigger mechanism 40 and is cammed downwardly thereby releasing the plate member 48 and slide bar 27. As the plate member 48 is released, the rotation of the dial pulley 72 is also stopped, thereby ceasing the dialing at the digit three. The coil spring 50 then rotates the plate member 48 in the opposite direction until the stop post 56 engages the stop bar 57 which again places the plate member 48 in proper position for dialing, and the dialing disc 68 is also released thereby and returned to its normal position.

As the pin 21 is pulled downwardly releasing the slide bar 27, the slide bar passes over the drive cam 33 which pushes the slide bar 27 inwardly in groove 16, and as the slide bar with the opening 28 moves one-half the distance to the next pin the turn-table makes one complete revolution without a pin engaging the plate member 48, and thereby gives the plate member 48 and dial disc 68 ample time to resume their rest position. Upon the next revolution of the turntable the slide bar is moved inwardly another notch whereby the second pin 21 moves through opening 28 and eventually engages the plate member through the second aperture in the row of fives as shown in Fig. 2. The plate member 48 is then carried around the setting point 66, released and the other operations performed as described in relation to the first digit are carried on until all the numbers have been dialed. The slide bar 27 with the additional notch 31′ permits the turn-table 8 to make one more additional revolution to provide ample time for the completion of the dialing, and then the extension member 36 is moved into alignment with the lever arm 37 of the switch 38 and engages the lever arm 37 thereby shutting off the dialing mechanism.

The phonograph 4, which was activated at the same time the dialing apparatus was, is now playing its recorded message, and upon answering of the call, the police or other designated person will receive the recorded message of alarm. When the needle of arm 96 is moving in the innermost grooves of the record 95, the arm 96 engages the switch 98 moving it to the off position, thereby stopping the phonograph motor 99 and also de-energizes the electromagnet 102. The spring actuated piston 103 then pushes the arm 77 outwardly, which lowers the receiver 88.

Figure 9:
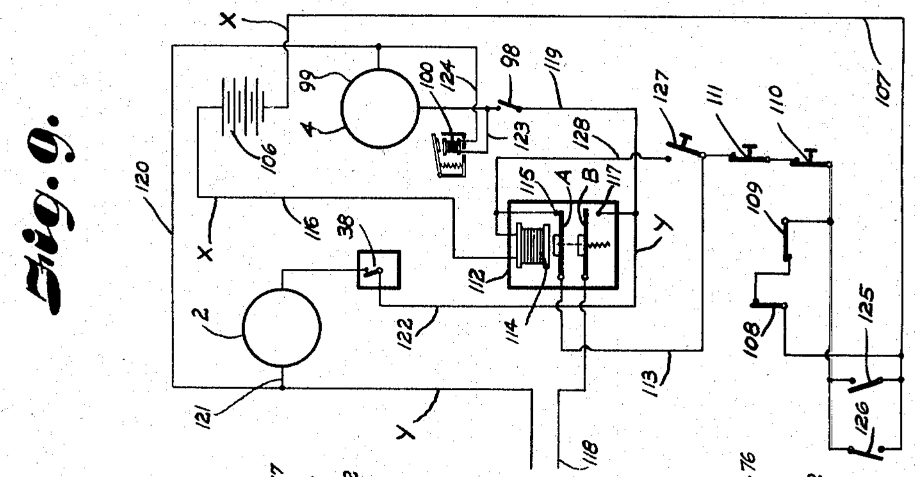
Fig. 9 is a diagrammatic illustration of an electrical circuit for the burglar alarm system.

A diagram of the electrical circuit is shown in Fig. 9 wherein, the current in an internal circuit X is carried from a battery 106 through a lead line 107 to what may be designated as windows 108 and doors 109, through closed alarm switches 110 and 111 to part A of a stick relay 112 by line 113. The current flows through the magnetic coil 114 of stick relay 112 which keeps a closed connection at 115, and then back to battery 106 through conductor 116. Should the circuit be broken by entry through a window or door, the magnetic attraction from the magnetic coil 114 is broken, and a part B of stick relay 112 closes contact with an external circuit Y at 117. The external circuit Y is through the phonograph 4 and dialing mechanism 2, with the current coming in through lead line 118, through the contact at 117, to the phonograph 4 by line 119 and out of the circuit by conductor 120. The dialing mechanism 2 is connected in parallel with the external circuit Y by line 121, through switch 38 and into the circuit Y by line 122. The relay mechanism 100 is connected in parallel with the lead lines 119 and 120 of the phonograph motor 99 by conductors 123 and 124.

With the circuit set for daytime use, or when the establishment is open for business, a manual throw switch 125 is closed and thereby closes the circuit even though the windows 108 and 109 may be open. In the event of a robbery or the like, the alarm switches 110 or 111 are preferably push buttons or the like and may be operated to open the internal circuit X and close the external circuit Y to the dialing mechanism 2, thereby giving the alarm. To provide for opening and closing of the establishment, I have provided a key operated switch 126, which may be operated by a key possessed by an authorized person from an outside lock (not shown). The key operated switch 126 closes the internal circuit X even though the door may be open and the manual switch 125 is open, but in opening and closing the establishment switch 126 must be closed to prevent giving an unnecessary alarm. After an alarm has been given, it is desirable to again open the external circuit Y and close the internal circuit X, to reset the dialing mechanism 2. A pickup switch 127 is provided between line 113 and a conductor 128, which may be closed to send the current through conductor 128 to the stick relay 112, thereby causing the magnetic coil 114 to be activated and pull the A part of the stick relay 112 into contact at 115, and breaks the contact of part B at 117. While I have shown and described a battery powdered internal circuit, obviously the power could come from any other suitable source, and the circuits through the various switches, doors and windows is by way of illustration only.

Figs. 10, 11, 12 and 13 show a modified form of my invention wherein the pin housing 17 and trigger mechanism 40 have been eliminated. Otherwise the modified alarm system is substantially identical with the one previously described, and therefore, the modified form will be described only insofar as it is structurally different than the one previously described.

The slide bar 27 has a recessed portion 129 with a resilient arm 130 secured to one end to the bottom side of the recessed portion 129, by a pin 131 through an opening in the recessed portion 129. The resilient arm 130 has a rigid pin 132 extending upwardly at the other end aligned with the opening 28 in the slide bar 27 and extending therethrough. The pin 132 has its inner face beveled as at 133 adjacent the upper end to define a cam surface thereon. The apertures 134 in the plate member 48 are identical to the apertures 63 previously described, except that the inner wall thereof is beveled as at 135 to provide a cam surface matching the cam surface defined by the beveled portion 133 of the pin 132 for depressing the pin 132 and the arm 130 as the slide bar 27 is moved inwardly by the driving cam 33. The pin 132 moves around the bottom face of the plate member 48 as the turn-table 8 is rotated in the same manner as the pin 21 and engages in an aperture in plate 48 when it comes into alignment therewith.

As the entire trigger mechanism is eliminated in my modified structure, the driving cam 33 causes the pin 132 to be disengaged from the respective operation in the plate member by forcing the pin cam surface 133 against the aperture cam surface 135, and therefore, it is essential that the driving cam 33 be substantially in radial alignment with the setting point 66 on the plate member 48 when the plate member is at rest with the stop post 56 engaging the stop bar 57. Hence, in assembling this modified structure, when the stop post 56 is in radial alignment with the setting point, the stop bar 57 is secured in substantially radial alignment with the driving cam 33, and thereby stops the revolution of the plate member 48 with the setting point 66 in proper alignment with the driving cam 33.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A telephone dialing alarm apparatus comprising a support, a turn-table rotatable on said support, means for rotating said turn-table, means movable radially on said turn-table, a plate member having an axis of rotation coaxial with the axis of rotation of said turn-table and being in sliding relation to said turn-table and having radially spaced means adapted to be engaged for rotating the plate member with said turn-table, resilient means urging said plate member to a fixed rest position in opposition to the rotation of said turn-table, means for transmitting a recorded alarm message and including a dialing disc, means connecting said plate member with the dialing disc for rotating said dialing disc relative to the rotation of said plate member, spring tensioned means mounted relative to said radially movable means and adapted to engage said engageable means for rotating said plate member with said turn-table, cam means for disengaging said spring tensioned means from said engageable means relative to the radial movement of said radially movable means whereby said plate member is released to return to said rest position, said cam means being positioned relative to said engageable means when the plate member is at said rest position whereby the degree of rotation of said plate member rotates said dialing disc through a corresponding degree of rotation to dial the digit represented by the respective engageable means, said radial movement being relative to said engageable means whereby said engageable means are engaged by said spring tensioned means one at a time and in radial succession, and means for activating said means for sending a recorded alarm message in response to the rotation of said turn-table.

2. A telephone dialing alarm apparatus comprising a support, a shaft extending vertically from said support, a turn-table rotatable about said shaft, means for rotating said turn-table, means slidable radially on said turn-table, a plate member rotatable about said shaft in sliding relation to said turn-table and having radially spaced apertures adapted to be engaged for rotating the plate member with said turn-table, resilient means urging said plate member to a fixed rest position in opposition to the rotation of said turntable, a telephone including a dialing disc and receiver, means connecting the plate member with said dialing disc for rotating said dialing disc relative to the rotation of said plate member, spring tensioned means mounted relative to said apertures and adapted to engage therein for rotating said plate member with said turn-table, cam means for disengaging said spring tensioned means from said apertures relative to the radial movement of said slide means whereby said plate member is released to return to said rest position, said cam means being positioned relative to said apertures when the plate member is at rest position whereby the degree of rotation of said plate member rotates said dialing disc through a corresponding degree of rotation to dial the digit represented by the aperture, said radial movement of the slide means being relative to said apertures whereby the respective apertures are engaged by said spring tensioned means one at a time and radial succession, means for raising said telephone receiver in response to the rotation of said turn-table, sound producing means adjacent said telephone receiver for playing a recorded message, and means for substantially simultaneous starting of said turn-table and sound producing means.

3. A telephone dialing alarm apparatus comprising a support, a shaft extending vertically from said support, a turn-table rotatable about said shaft, means for rotating said turn-table, said turn-table having a radial groove opening upwardly and extending from adjacent said shaft through the outer edge of the turn-table, an elongate slide bar movable radially in said groove, a plate member rotatable about said shaft in sliding relation to said turn-table and having radially spaced means adapted to be engaged for rotating the plate member with said turn-table, resilient means urging said plate member to a fixed rest position in opposition to the rotation of said turn-table, a telphone including a dialing disc and receiver, a hub and pulley on said plate member, means connecting said pulley and dialing disc for rotating said dialing disc relative to the rotation of said plate member, spring tensioned means mounted relative to said engageable means and adapted to engage therein for rotating said plate member with said turn-table, cam means for disengaging said spring tensioned means from said engageable means relative to the radial movement of the slide bar whereby said plate member is released to return to said rest position, said cam means being positioned relative to said engageable means when the plate member is at rest position whereby the degree of rotation of said plate member rotates said dialing disc through a corresponding degree of rotation to dial the digit represented by the respective engageable means, said radial movement of the slide bar being relative to said engageable means whereby the respective engageable means are engaged by said spring tensioned means one at a time and in radial succession, means for raising said telephone receiver in response to the rotation of said turn-table, sound producing means adjacent said telephone receiver for playing a recorded message, and means for substantially simultaneous starting of said turn-table and sound producing means.

4. A telephone dialing alarm apparatus comprising a support, a shaft extending vertically from said support, a turn-table rotatable about said shaft, means for rotating said turn-table said turn-table having a radial groove opening upwardly and extending from adjacent said shaft through the outer edge of the turn-table, an elongate slide bar movable radially in said groove, a plate member rotatable about said shaft in sliding relation to said turn-table and having rows of radially aligned apertures spaced circumferentially apart, resilient means urging said plate member to a fixed rest position in opposition to the rotation of said turn-table, a telephone including a dialing disc and receiver, a hub and pulley on said plate member, means connecting said pulley and dialing disc for rotating said dialing disc relative to the rotation of said plate member, spring tensioned means mounted relative to said apertures and adapted to engage therein for rotating said plate member with said turntable, screws threaded in all of the said apertures except the apertures representing the digits to be dialed and leaving open apertures radially spaced in the sequence of said digits, cam means for disengaging said spring tensioned means from said apertures relative to the radial movement of the slide bar whereby said plate member is released to return to said rest position, said cam means being positioned relative to a respective row of apertures when the plate member is at rest position whereby the degree of rotation of said plate member rotates said dialing disc through a corresponding degree of rotation to dial the digit represented by said respective row of apertures, said radial movement of the slide bar being relative to said apertures whereby said open apertures are engaged by said spring tensioned means one at a time and in radial succession, means for raising said telephone receiver in response to the rotation of said turn-table, sound producing means adjacent said telephone receiver for playing a recorded message, and means for substantially simultaneous starting of said turn-table and sound producing means.

5. A telephone dialing alarm apparatus comprising a support, a turn-table rotatable mounted on said support, means for rotating said turn-table, means movable radially on said turn-table, a plate member having an axis of rotation coaxial with the axis of rotation of said turn-table and being in sliding relation to said turn-table, radially spaced means on said plate member adapted to be engaged for rotating the plate member with said turn-table, resilient means urging said plate member to a fixed rest position in opposition to the rotation of said turn-table, means for transmitting a recorded alarm message and including a dialing disc, means connecting the plate member with said dialing disc for rotating said dialing disc relative to the rotation of said plate member, spring tensioned means mounted on said turn-table relative to said radially movable means and adapted to engage said engageable means for rotating said plate member with said turn-table, cam means for disengaging said spring tensioned means from said engageable means whereby said plate member is released to return to said rest position, said cam means being positioned relative to said engageable means when the plate member is at rest position whereby the degree of rotation of said plate member rotates said dialing disc through a corresponding degree of rotation to dial the digit represented by the respective engageable means, means for moving said radially movable means radially on said turn-table upon rotation thereof and mounted relative to said cam means whereby the radially movable means is moved radially when said spring tensioned means are disengaged from said engageable means, said radial movement being relative to said engageable means whereby said engageable means are engaged by said spring tensioned means one at a time and in radial succession, and means for activating said means for sending a recorded alarm message in response to the rotation of said turn-table.

6. A telephone dialing alarm apparatus comprising a support, a shaft extending vertically from said support, a turn-table rotatable about said shaft, means for rotating said turn-table, means slidable radially on said turn-table, a plate member rotatable about said shaft in sliding relation to said turn-table and having radially spaced apertures adapted to be engaged for rotating the plate member with said turn-table, resilient means urging said plate member to a fixed rest position in opposition to the rotation of said turn-table, a telephone including a dialing disc and receiver, means connecting the plate member with said dialing disc for rotating said dialing disc relative to the rotation of said plate member, spring tensioned means mounted on said turn-table relative to said slide means and adapted to engage said apertures for rotating said plate member with said turn-table, cam means for disengaging said spring tensioned means from said apertures whereby said plate member is released to return to said rest position, said cam means being positioned relative to said apertures when the plate member is at said rest position whereby the degree of rotation of said plate member rotates said dialing disc through a corresponding degree of rotation to dial the digit represented by the respective aperture, means for moving said slide means radially on said turn-table upon rotation thereof, said radial movement being relative to said apertures whereby said apertures are engaged by said spring tensioned means one at a time and in radial succession, means for raising said telephone receiver in response to the rotation of said turn-table, sound producing means adjacent said telephone receiver for playing a recorded message, and means for substantially simultaneous starting of said turntable and sound producing means.

7. A telephone dialing alarm apparatus comprising, a support, a shaft extending vertically from said support, a turn-table rotatable about said shaft, means for rotating said turn-table, said turn-table having a radial groove opening upwardly and extending from adjacent said shaft through the outer edge of the turn-table, an elongate slide bar movable radially in said groove, a plate member rotatable about said shaft in sliding relation to said turn-table and having radially spaced means engageable for rotating the plate member with said turn-table, resilient means urging said plate member to a fixed rest position in opposition to the rotation of said turn-table, a telephone including a dialing disc and receiver, means connecting the plate member with said dialing disc for rotating said dialing disc relative to the rotation of said plate member, spring tensioned means aligned radially on said turn-table in communication with the bottom of said groove and adapted to engage said engageable means for rotating said plate member with said turn-table, said slide bar being in overlying relation to said spring tensioned means and having an aperture therein adapted to align with said spring tensioned means whereby one said spring tensioned means will extend through said aperture to engage the respective engageable means, cam means for disengaging said spring tensioned means from said engageable means whereby said plate member is released to return to said rest position, said cam means being positioned relative to said engageable means when the plate member is at said rest position whereby the degree of rotation of said plate member rotates said dialing disc through a corresponding degree of rotation to dial the digit represented by the respective engageable means, means for moving said slide bar radially on said turn-table upon rotation thereof, said radial movement of the slide bar being relative to said engageable means whereby said engageable means are engaged by said spring tensioned means one at a time and in radial succession, means for raising said telephone receiver in response to the rotation of said turn-table, sound producing means adjacent said telephone receiver for playing a recorded message, and means for substantially simultaneous starting of said turn-table and sound producing means.

8. A telephone dialing alarm apparatus comprising, a support, a shaft extending vertically from said support, a turn-table rotatable about said shaft, means for rotating said turn-table, said turn-table having a radial groove opening upwardly and extending from adjacent said shaft through the outer edge of the turn-table, an elongate slide bar movable radially in said groove, a plate member rotatable about said shaft in sliding relation to said turn-table and having rows of radially aligned apertures spaced circumferentially apart, resilient means urging said plate member to a fixed rest position in opposition to the rotation of said turn-table, a telephone including a dialing disc and receiver, a hub and pulley on said plate member, means connecting said pulley and dialing disc for rotating said dialing disc relative to the rotation of said plate member, spring tensioned means aligned radially on said turn-table in communication with the bottom of said groove and adapted to engage in said apertures for rotating said plate member with said turn-table, screws threaded in all of the said apertures except the apertures representing the digits to be dialed and leaving open apertures radially spaced in the sequence of said digits, said slide bar being in overlying relation to said spring tensioned means and having an opening therein adapted to align with said spring tensioned means whereby one said spring tensioned means will extend through said opening to engage in the respective open aperture, cam means for disengaging said spring tensioned means from said aperture whereby said plate member is released to return to said rest position, said cam means being positioned relative to a respective row of apertures when the plate member is at said rest position whereby the degree of rotation of said plate member rotates said dialing disc through a corresponding degree of rotation to dial the digit represented by said respective row of apertures, means for moving said slide bar radially in said groove upon rotation of the turn-table, said radial movement of the slide bar being relative to said spring tensioned means whereby said spring tensioned means extend through the opening in said slide bar at a time and in radial succession, means for raising said telephone receiver in response to the rotation of said turn-table, sound producing means adjacent said telephone receiver for playing a recorded message, and means for substantially simultaneous starting of said turn-table and sound producing means.

9. A telephone dialing alarm apparatus comprising, a support, a turn-table rotatable on said support, means for rotating said turn-table, means movable radially on said turn-table, a plate member having an axis of rotation coaxial with the axis of rotation of said turn-table and being in sliding relation to said turn-table, radially spaced means on said plate member adapted to be engaged for rotating the plate member with said turn-table, resilient means urging said plate member to a fixed rest position in opposition to the rotation of said turn-table, means for sending a recorded alarm message and including a dialing disc, means connecting the plate member with said dialing disc for rotating said dialing disc relative to the rotation of said plate member, spring tensioned means mounted on said radially movable means and adapted to engage said engageable means for rotating said plate member with said turn-table, said spring tensioned means and engageable means having mating cam surfaces, cam means for moving said radially movable means radially on said turn-table upon rotation of the turn-table and said movement engaging said mating cam surfaces thereby disengaging said spring tensioned means from said engageable means whereby said plate member is released to return to said rest position, said cam means being positioned relative to said engageable means when the plate member is at said rest position whereby the degree of rotation of said plate member rotates said dialing disc through a corresponding degree of rotation to dial the digit represented by the respective engageable means, said radial movement being relative to said engageable means whereby said engageable means are engaged by said spring tensioned means one at a time and in radial succession, and means for activating said means for sending a recorded alarm message in response to the rotation of said turn-table.

10. A telephone dialing alarm apparatus comprising, a support, a shaft extending vertically from said support, a turn-table rotatable about said shaft, means for rotating said turn-table, means slidable radially on said turntable, a plate member rotatable about said shaft in sliding relation to said turn-table and having radially spaced apertures adapted to be engaged for rotating the plate member with said turn-table, resilient means urging said plate member to a fixed rest position in opposition to the rotation of said turn-table, a telephone including a dialing disc and receiver, means connecting the plate member with said dialing disc for rotating said dialing disc relative to the rotation of said plate member, spring tensioned means mounted on said slide means and adapted to engage said apertures for rotating said plate member with said turn-table, said spring tensioned means and apertures having mating cam surfaces, cam means for moving said slide means radially on said turn-table upon rotation thereof and said movement engaging said mating cam surfaces thereby disengaging said spring tensioned means from the respective aperture whereby said plate member is released to return to said rest position, said cam means being positioned relative to said apertures when the plate member is at said rest position whereby the degree of rotating of said plate member rotates said dialing disc through a corresponding degree of rotation to dial the digit represented by the respective aperture, said radial movement being relative to said apertures whereby said apertures are engaged by said spring tensioned means one at a time and in radial succession, means for raising said telephone receiver in response to to the rotation of said turn-table, sound producing means adjacent said telephone receiver for playing a recorded message, and means for substantially simultaneous starting of said turn-table and sound producing means.

11. A telephone dialing alarm apparatus comprising a support, a shaft extending vertically from said support, a turn-table rotatable about said shaft, means for rotating said turn-table, said turn-table having a radial groove opening upwardly and extending from adjacent said shaft through the outer edge of the turn-table, an elongate slide bar movable radially in said groove, a plate member rotatable about said shaft in sliding relation to said turn-table and having radially spaced means adapted to be engaged for rotating the plate member with said turntable, resilient means urging said plate member to a fixed rest position in opposition to the rotation of said turntable, a telephone including a dialing disc and receiver, means connecting the plate member with said dialing disc for rotating said dialing disc relative to the rotation of said plate member, spring tensioned means mounted on said slide bar and adapted to engage said engageable means for rotating said plate member with said turn-table, said spring tensioned means and engageable means having mating cam surfaces, cam means for moving said slide bar radially in said groove upon rotation of the turn-table and said movement engaging said mating cam surface thereby disengaging said spring tensioned means from said engageable means whereby said plate member is released to return to said rest position, said cam means being positioned relative to said engageable means when the plate member is at said rest position whereby the degree of rotation of said plate member rotates said dialing disc through a corresponding degree of rotation to dial the digit represented by the respective engageable means, said radial movement of the slide bar being relative to said engageable means whereby said engageable means are engaged by said spring tensioned means one at a time and in radial succession, means for raising said telephone receiver in response to the rotation of said turn-table, sound producing means adjacent said telephone receiver for playing a recorded message, and means for substantially simultaneous starting of said turn-table and sound producing means.

12. A telephone dialing alarm aparatus comprising, a support, a shaft extending vertically from said support, a turntable rotatable about said shaft, means for rotating said turntable, said turn-table having a radial groove opening upwardly and extending from adjacent said shaft through the outer edge of the turn-table, an elongate slide bar movable radially in said groove, a plate member rotatable about said shaft in sliding relation to said turntable and having rows of radially aligned apertures spaced circumferentially apart, resilient means urging said plate member to a fixed rest position in opposition to the rotation of said turntable, a telephone including a dialing disc and receiver, a hub and pulley on said plate member, means connecting said pulley and dialing disc for rotating said dialing disc relative to the rotation of said plate member, spring tensioned means mounted on said slide bar to engage in said apertures for rotating said plate member with said turn-table, screws threaded in all of the said apertures except the apertures representing the digits to be dialed and leaving open apertures radially spaced in the sequence of said digits, said spring tensioned means and apertures having mating cam surfaces, cam means for moving said slide bar radially in said groove upon rotation of the turn-table and said movement engaging said mating cam surfaces thereby disengaging said spring tensioned means from the respective aperture whereby said plate member is released to return to said rest position, said cam means being positioned relative to a respective row of apertures when the plate member is at said rest position whereby the degree of rotation of said plate member rotates said dialing disc through a corresponding degree of rotation to dial the digit represented by said respective row of apertures, said radial movement of the slide bar being relative to said apertures whereby said open apertures are engaged by said spring tensioned means one at a time and in radial succession, means for raising said telephone receiver in response to the rotation of said turn-table, sound producing means adjacent said telephone receiver for playing a recorded message, and means for substantially simultaneous starting of said turn-table and sound producing means.

13. A telephone dialing alarm apparatus comprising a support, a turn-table rotatable on said support, means for rotating said turn-table, a plate member having an axis of rotation coaxial with the axis of rotation of said turntable and having spaced means adapted to be engaged for rotating the plate member with said turn-table, resilient means urging said plate member to a fixed rest position in opposition to the rotation of said turn-table, means for transmitting a recorded alarm message and including a dialing disc, means connecting said plate member with the dialing disc for rotating said dialing disc relative to the rotation of said plate member, abutment means carried by said turn-table and adapted to engage said engageable means for rotating said plate member with said turn-table, cam means for disengaging said abutment means from said engageable means in response to rotative movement of said turn-table whereby said plate member is released to return to said rest position, said cam means being positioned relative to said engageable means when the plate member is at rest position whereby the degree of rotation of said plate member rotates said dialing disc through a corresponding degree of rotation to dial the digit represented by the respective engageable means, means effecting engagement of said engageable means by said abutment means one at a time and in succession, and means for activating said means for sending a recorded alarm message in response to rotation of said turn-table.

References Cited in the file of this patent

UNITED STATES PATENTS

| | | |
|---|---|---|
| 2,371,051 | Kendig | Mar. 6, 1945 |
| 2,512,981 | Svoekhotoff | June 27, 1950 |
| 2,661,394 | Munch | Dec. 1, 1953 |
| 2,769,032 | Strother | Oct. 30, 1956 |
| 2,830,119 | Simmerman | Apr. 8, 1958 |